3,274,282
CATALYSTS AND THE HYDROGENATION OF UNSATURATED HYDROCARBONS USING SAID CATALYSTS
Kenneth Hugh Bourne and Peter Desmond Holmes, Sunbury-on-Thames, England, assignors to The British Petroleum Company Limited, London, England, a British joint-stock corporation
No Drawing. Original application Oct. 11, 1960, Ser. No. 61,832. Divided and this application Aug. 31, 1964, Ser. No. 438,803
3 Claims. (Cl. 260—677)

This application is a division of our copending application Serial No. 61,832, filed October 11, 1960, now abandoned.

This invention relates to an improved catalyst and to a process of hydrogenation using said catalyst.

It is an object of the present invention to provide a catalyst of high activity. It is a further object to provide an improved hydrogenation process. It is a further object to provide an improved process for the selective hydrogenation of acetylenes contained in mixtures of an acetylene and an olefin. Other objects will appear hereinafter.

According to one aspect of the present invention there is provided a process for the production of a catalyst which comprises impregnating a porous catalyst base with a solution of a nickel compound which is decomposable, by the action of heat, to metallic nickel, and thereafter heating the impregnated porous support, whereby metallic nickel is deposited on said support and a catalyst thereby formed, and sweeping out volatile decomposition products of the nickel compound by means of a stream of gas passed over the catalyst at a high flow rate.

Usually the heat treatment of the impregnated porous base and the sweeping out of volatile decomposition products will be carried out simultaneously.

We have found that catalysts so produced have a higher hydrogenation activity than have catalysts produced in similar manner but using a stream of gas at low flow rate to sweep out the volatile decomposition products. In particular, the catalyst of this invention has a high activity, while retaining good selectivity, for the hydrogenation of an acetylene in the presence of an olefin.

In general a flow rate of 250 vol./vol./hour will yield a catalyst of undesirably low activity. In accordance with this invention we prefer to use flow rates of at least 500 vol./vol./hour and usually of at least 1000 vol./vol./hour. Preferably the heat-treatment which, as stated hereinbefore, may be combined with the sweeping out of volatile decompisition products is carried out a temperature in the range 150–300° C.

Suitable gases for sweeping out the volatile decomposition products are hydrogen, nitrogen, carbon dioxide, methane and mixtures of these gases. A gas consisting of or containing hydrogen or nitrogen is preferred.

Preferably the nickel compound used forms a complex ammonia and is employed as a solution in aqueous ammonia. Preferably the nickel compound used in the preparation of the catalyst is nickel formate.

Preferably the catalyst base is of low activity. Preferably the catalyst base in relation to gamma alumina has a lower activity for cracking reactions, a lower activity for polymerisation reactions and a lower activity for isomerisation reactions.

Suitable catalyst bases are calcium oxide, barium oxide, strontium oxide, magnesium oxide, calcium carbonate, barium carbonate, strontium carbonate, magnesium carbonate, diatomaceous earths, fire brick derived from diatomaceous earth, carbon, for example charcoal and graphite, and pumice.

Other catalyst bases which may be employed are catalyst bases obtained by reduction of the activity of high activity catalyst bases. A suitable material of this type is a steam deactivated alumina or a thermally deactivated alumina.

The preferred catalyst base is sepiolite.

Sepiolite is a commercially available clay mineral, which occurs naturally and which can also be prepared synthetically. It has the ideal formula

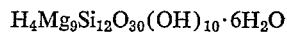
$H_4Mg_9Si_{12}O_{30}(OH)_{10} \cdot 6H_2O$ and is also known as meerschaum.

According to another aspect of the present invention there is provided a process, for the hydrogenation of acetylenes, which comprises passing a mixture consisting of or containing an acetylene and an olefin with a molecular hydrogen-containing gas over a catalyst produced as hereinbefore described. In carrying out this process the feedstock is blended with a hydrogen-containing gas and passed over the catalyst. Preferably commercially pure hyrogen is employed; if desired, however, for example when using a feedstock which already contains substantial amounts of inerts, hydrogenation may be carried out using a gas consisting of hydrogen together with inert constituents. Preferably, when inert constituents are present, the gas, before blending, contains at least 25 mol percent of hydrogen, the proportion suitably lying within the range 25–90 mol percent of hydrogen. Suitably a gas is employed containing 70 mol percent of hydrogen. A typical gas will consist of 70 mol percent of hydrogen and 30 mol percent of methane. Of the gases containing inert constituents, a preferred gas is a platformer tail gas. Other suitable gases are steam cracker tail gas, catalytic cracker tail gas and tail gas derived from the dehydrogenation of hydrocarbons.

The hydrogenation may conveniently be carried out at a temperature in the range 0° to 200° C. and preferably in the range 20–100° C.; and at a pressure in the range 0 to 1000 lbs./sq. in. gauge.

The amount of hydrogen employed will usually constitute 0.5–5 mol percent of the blend of hydrogen and feedstock. Clearly the amount will be determined in part by the nature of the feedstock and either higher or lower proportions may, in certain cases, be found to be preferable.

As will be apparent from the following examples, a wide range of space velocities is possible; preferably space velocities greater than 1000 vol./vol./hour are employed.

The selection of the desired combination of reaction conditions will be dependent, in part, upon the percentage conversion of acetlyene which is desired; it will be understood that the removal of trace amounts of acetylene may necessitate the loss of some olefin. Losses of olefins may be reduced by reducing the excess of hydrogen over that required to hydrogenate the acetylene. By way of illustration, in the treatment of ethylene containing $C_2H_2$, using commercially pure hydrogen at 1.7 mol percent of the blend of feedstock and hydrogen, reaction temperature at 62° C., reaction pressure at 100 lbs./sq. in. gauge, and a space velocity of 2000 vol./vol./hour over a nickel-on-sepiolite catalyst, acetylene may be reduced from 2600 to less than 2 p.p.m. with a loss of less than 1.5 mol percent of the ethylene.

The invention is illustrated but not limited with reference to the following examples.

*Example 1*

A porous support consisting of sepiolite in the form of 4–8 mesh BSS granules was impregnated with a solution of nickel formate in aqueous ammonia so that the caltalyst after activation contained 10% weight of nickel. After drying the catalyst was broken down into granules of 6–12 mesh BSS.

In a series of runs, samples of fresh catalyst so prepared were treated with hydrogen gas at atmospheric pressure at different flow rates while heating the material from 25° to 250° C. over a period of 1½ to 2 hours and thereafter maintaining the material at 250° C. for four hours. Each catalyst so produced was used for the treatment of commercial ethylene with hydrogen at 100 lbs./sq. in. gauge, 2000 vol./vol./hour and at a temperature in the range 50–60° C. The commercial ethylene contained 2700 p.p.m. of acetlyene. Conditions employed in each run and the results obtained are shown in the following Table 1.

TABLE 1

| Hydrogen Activation, GHSV | $H_2$/Acetylene Mol Ratio | Temperature, ° C. | Acetylene Content of Product, p.p.m. |
|---|---|---|---|
| ca. 250 | 7.5 | 50 | 1,700 |
| ca. 250 | 11.5 | 50 | 2,500 |
| 250 | 11.5 | 50 | 1,600 |
| 250 | 19 | 50 | 2,200 |
| 1,000 | 4 | 60 | 15 |
| 1,200 | 19 | 52 | 10 |
| 2,500 | 6.5 | 62 | 1–2 |

GHSV=Gaseous hourly space velocity in vol. $H_2$/vol. catalyst/hour.

The results show that pretreatment with hydrogen at a flow of 250 vol./vol./hour gave a catalyst of low activity. At flow rates above 1000 vol./vol./hour activity was greatly improved and acetylene was reduced to a few p.p.m. in the products.

*Example 2*

Batches of nickel formate on sepiolite catalyst (12–18 BSS mesh granules) were treated with nitrogen having only a low concentration of impurities (ca. 15 p.p.m. oxygen) under various flow rates during the heating of catalyst from ca. 25° C. to 250° C. and for a further 4 hours at 250° C.

Standard activity tests were then carried out at 30° C., 50 p.s.i.g., 200 v./v./hr. using a commercial propylene stream blended with a small amount (1–2%) of hydrogen. The percentage removal of the methyl-acetylene and propadiene contaminants are shown in Table 2.

TABLE 2

| $N_2$ Activation, GHSV | Percentage Removal of Contaminants | |
|---|---|---|
| | Methylacetylene | Propadiene |
| 200 | 50 | 32 |
| 500 | 58 | 40 |
| 1,000 | 62 | 43 |

GHSV=Gaseous hourly space velocity in vol. $H_2$/vol. catalyst/hour.

These results show that treatment of the fresh catalyst under high velocity nitrogen streams increases the activity of the catalyst for the removal of contaminants.

It will be understood that the run using nitrogen activation at a GHSV of 200 is not illustrative of the invention but is provided for purposes of comparison only.

*Example 3*

Samples of the fresh catalyst described in Example 2 were activated at a GHVS of 1000 with commercial hydrogen under the conditions described in Example 2. Activities with a commercial propylene/hydrogen blend at 200 v./v./hr. are given in Table 3.

TABLE 3

| $N_2$ Activation, GHSV | Percentage Removal of Contaminants | |
|---|---|---|
| | Methylacetylene | Propadiene |
| 1,000 | 82 | 47.5 |

What we claim is:

1. A process for the selective hydrogenation of acetylenes which comprises; passing a feedstock mixture of an olefin containing a minor proportion of an acetylene with a molecular hydrogen-containing gas over a selective hydrogenation caltayst at a reaction temperature in the range of 0–200° C.; said catalyst formed by impregnating a porous catalyst base with a solution of nickel formate; heating the impregnated porous catalyst base under non-oxidising conditions at a temperature of between about 150–300° C. sufficient to decompose the nickel formate and liberate metallic nickel whereby metallic nickel is deposited on said base and a catalyst thereby formed; and substantially simultaneuosly with said heating sweeping out volatile decomposition products of the nickel formate by means of a stream of non-oxidising gas over the catalyst at a high flow rate of at least 500 vol./vol/hour.

2. A process for the selective hydrogenation of acetylenes as specfied in claim 1 in which said reaction to pressure lies in the range 0 to 1000 lbs./sq. in. gauge.

3. A process for the selective hydrogenation of acetylenes as specified in claim 2 in which the space velocity used in the hydrogenation reaction is greater than 1000 vol./vol./hour.

References Cited by the Examiner

UNITED STATES PATENTS 3,004,914 10/1961 White _____ 208—255

ALPHONSO D. SULLIVAN, *Primary Examiner.*

UNITED STATES PATENT OFFICE
CERTIFICATE OF CORRECTION

Patent No. 3,274,282

September 20, 1966

Kenneth Hugh Bourne et al.

It is hereby certified that error appears in the above numbered patent requiring correction and that the said Letters Patent should read as corrected below.

Column 1, line 59, for "used forms a complex ammonia" read -- used forms a complex with ammonia --; column 3, line 57, for "$H_2$/vol" read -- $N_2$/vol --; column 4, line 14, for "200 v/v/hr" read -- 2000 v/v/hr --.

Signed and sealed this 22nd day of August 1967.

(SEAL)
Attest:

ERNEST W. SWIDER
Attesting Officer

EDWARD J. BRENNER
Commissioner of Patents